United States Patent

Kamei et al.

[11] 3,972,733
[45] Aug. 3, 1976

[54] METHOD FOR PRODUCING ELECTRICAL ENERGY BY MEANS OF LIQUID CRYSTAL DEVICES

[75] Inventors: Hirotake Kamei, Kunitachi; Takeo Ozawa, Higashi-Kurume; Ken Nozaki, Tokyo; Takitaro Morikawa, Sayama, all of Japan

[73] Assignee: Agency of Industrial Science & Technology, Tokyo, Japan

[22] Filed: Jan. 21, 1974

[21] Appl. No.: 435,119

Related U.S. Application Data

[63] Continuation of Ser. No. 222,246, Jan. 31, 1972, abandoned.

[30] Foreign Application Priority Data

| Jan. 29, 1971 | Japan | 46-2848 |
| Mar. 12, 1971 | Japan | 46-13117 |
| Mar. 20, 1971 | Japan | 46-15513 |
| May 26, 1971 | Japan | 46-35502 |
| June 6, 1971 | Japan | 46-46857 |
| Sept. 1, 1971 | Japan | 46-66602 |

[52] U.S. Cl. ............................ 136/89; 350/160 LC
[51] Int. Cl.² .................................... H01L 31/08
[58] Field of Search ............. 136/89; 252/408 LC; 350/160 LC; 250/331

[56] References Cited
UNITED STATES PATENTS

| 3,322,485 | 5/1967 | Williams | 350/160 LC |
| 3,322,485 | 5/1967 | Williams | 350/160 LC |
| 3,599,044 | 8/1971 | Castellano | 350/160 LC |
| 3,675,988 | 7/1972 | Soref | 350/160 LC |
| 3,697,150 | 10/1972 | Wysocki | 350/160 LC X |
| 3,707,323 | 12/1972 | Kessler et al. | 350/160 LC X |
| 3,768,886 | 10/1973 | Sharpless | 350/160 LC |

FOREIGN PATENTS OR APPLICATIONS

150,885  1961  U.S.S.R. ................. 136/89

OTHER PUBLICATIONS

Derzhanski et al., Inverse Currents & Contact Behavior of Some Nematic Liquid Crystals, in Physics Letters 13/9/71, vol. 36A No. 4, pp. 307, 308.
Gray, Molecular Structure & the Properties of Liquid Crystals, 1962, Academic Press, pp. 125–136.
Foote, Liquid Crystals, International Critical Tables vol. I, 1926, pp. 314–320.

*Primary Examiner*—Allen B. Curtis
*Attorney, Agent, or Firm*—Kurt Kelman

[57] ABSTRACT

Method for producing electrical energy by means of a liquid crystal device having opposite electrode plates between which a liquid crystal is inserted and at least one of which is transparent. The opposite electrode plates include asymmetrical electrodes thereon, at least the electrodes on the transparent plate being transparent. When a voltage is applied across any electrodes of the opposite plates an optical display is provided and when a light is directed to any selected transparent electrodes a voltage is induced between the transparent electrode and the corresponding electrodes on the other plate, to thereby provide a photoelectric converting property which can be used for display, position determination and logic operations etc. When a liquid crystal material which is a mixture of the compounds $p$-methoxybenzal-$p$-amino-$\alpha$-methylcinnamic acid n-propyl-ester, $p$-methoxybenzal-$p$-acetoxyaniline, $p,p'$-di-n-hexyloxyazoxybenzene and anisole is used in the device it can be operated at relatively low temperature.

7 Claims, 47 Drawing Figures

METHOD FOR PRODUCING ELECTRICAL ENERGY BY MEANS OF LIQUID CRYSTAL DEVICES

This application is a continuing application of U.S. patent application Ser. No. 222,246, filed Jan. 31, 1972, now abandoned.

The present invention relates to novel liquid crystal devices and to a novel liquid crystals.

Heretofore a variety of liquid crystals have been known and several kinds of varieties of liquid crystals have been proposed for display, etc. Such liquid crystal devices employ the characteristic of the liquid crystal to change in the transparency when an electric field is applied thereto. Such a liquid crystal device is applicable to display devices etc.

However, since the conventional liquid crystal changes in state from crystal to nematic liquid crystal at a temperature higher than room temperature, the applicability thereof to actual devices is severely limited.

One object of the present invention is to provide a liquid crystal devices having no such problem of transition temperature and this device is realized by providing the novel liquid crystals.

Heretofore, the only devices known were those which utilize the previously mentioned characteristic of the electric crystal material to change in permeability etc. when an electric field is applied. However, the inventors have developed liquid crystal devices which can generate an electromotive force when irradiated by light.

Therefore, another object of the present invention is to provide liquid crystal devices using novel liquid crystals and unique constructions, which can produce an electromotive force when irradiated by light.

A liquid crystal device capable of photo-electric convertion can be given a variety of applications. Therefore, another object of the present invention is to provide an optical-input display device which, using the above mentioned liquid crystal device, has an electrically controlled display and is capable of accepting light input.

A further object of the present invention is to provide a liquid crystal device using the above mentioned novel liquid crystal material, which is applicable to identification of a contour of the image by spatially-differentiating a contrast of the image.

Another object of the present invention is to provide a liquid crystal device using the above mentioned liquid crystals which is capable of determining the relative or absolute position between objects.

A further object of the present invention is to provide a liquid crystal device using the above mentioned liquid crystals which can be used for a logic circuit.

The above described and other objects and advantages of the present invention will become apparent from the descriptions of embodiments of the invention with reference to the attached drawings, in which:

FIG. 26 is another embodiment of the present invention in which

Figure 1:
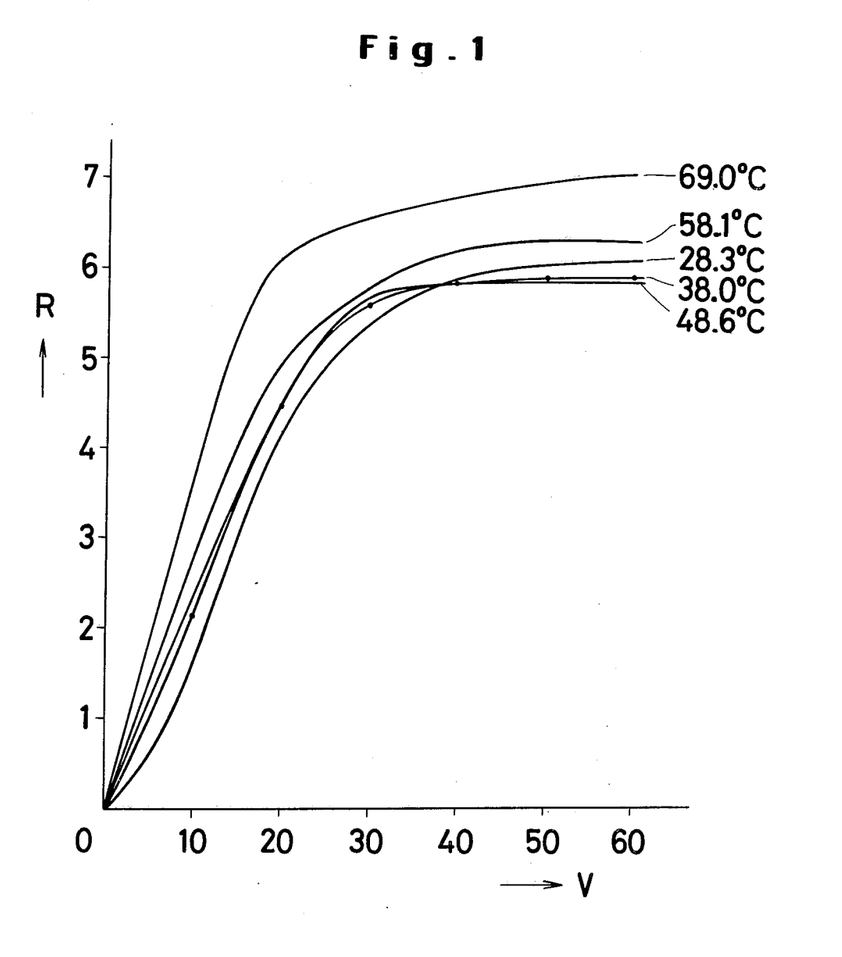
FIG. 1 is a graph of the characteristics of the present mixture of liquid crystal.

Returning now to the drawings, in particular to FIG. 1 which shows the characteristics of the mixture type liquid crystal material in accordance with the present invention.

p-Methoxybenzal-p-amino-α-methyl-cinnamic acidn-propyl ester (I), p-methoxybenzal-p'-acetoxyaniline

(II), and p,p'-di-n-hexyloxyazoxybenzene (III)

respectively transform in state from solid to nematic liquid crystal at 50°, 82° and 81°C and from liquid crystal to isotropic liquid at 85°, 110° and 127°C.

In general, the melting point of a solid eutectic mixture of two or more substances is lower than the melting points of any of the components. That is, the melting point of the mixture is the lowest of the group consisting of itself and the constituent materials. The above mentioned three compounds (I), (II) and (III) constitute an eutectic mixture. The eutectic mixture is in a nematic liquid crystal phase in a certain temperature range. The transition points of the mixture system from solid to nematic liquid crystal and from nematic liquid crystal to isotropic liquid is dependent upon the composition thereof. Thus, it is possible to provide a mixture system which is in liquid crystal phase at room temperature. In order to lower the temperature range in which the mixture is in liquid crystal state, it is sufficient to add a material which does not have a liquid crystal state and is liquid in the vicinity of room temperature, e.g. anisole (IV), to the mixture. As an example of such mixture liquid crystal, a mixture of the compounds (I), (II), and (III) and (IV) by a ratio of 2 : 1 : 2 : 0.01 is in a nematic liquid crystal state in a temperature range of from 5° to 44°C. This mixed liquid crystal exhibits a dynamic scattering mode under application of an electric field and thus can be utilized as a display device and/or light attenuating filter.

Some examples of the mixing ratio of the above mentioned compounds and the temperature range in which the mixture is in liquid crystal state is shown in the following table:

① (I) : (II) : (III) : (IV) = 4 : 1 : 4 : 0.1
　　　−6° ~ 21°C
② (I) : (II) : (III) : (IV) = 4 : 1 : 4 : 0.01
　　　0° ~ 33°C
③ (I) : (II) : (III) : (IV) = 2 : 1 : 2 : 0.1
　　　5° ~ 44°C
④ (I) : (II) : (III) : (IV) = 1 : 1 : 0.1 : 0.001
　　　28° ~ 74°C
⑤ (I) : (II) : (III) = 1 : 1 : 0.1
　　　29° ~ 76°C

From the above table, it is clear that by changing the ratio of the constituent materials, it is possible to obtain a mixture which is in liquid crystal state over the desired temperature range.

The rising and falling times of the light transparency of the mixture due to the dynamic scattering mode when the electric field is applied and removed are dependent on the ratio of the constituents and the temperature. An example is shown in the following table which shows the variation in the rising and falling times of the light transparency for a mixture according to example ratio ④ when the thickness of the crystal film is 25μm and the electric field applied and removed is 50V.

| Temperature (°C) | rising time (sec) | falling time (sec) |
|---|---|---|
| 69 | 0.014 | 0.19 |
| 58.1 | 0.030 | 0.29 |
| 48.6 | 0.125 | 0.46 |
| 38.0 | 0.39 | 1.20 |
| 28.3 | 0.56 | 2.95 |

FIG. 1 shows the relationship between the transparency and the applied voltage for a single sample at different temperatures. In FIG. 1 the abscissa represents the applied voltage in volts and the vertical axis represents the light transparency ratio R, and the sample is one formed in accordance with the above described ratio ⑤, that is, (I) : (II) : (III) = 1 : 1 : 0.1.

Such three- or four-component mixture liquid crystals as described above exhibit the dynamic scattering mode in the vicinity of room temperature and can be used for display devices.

Furthermore, since the nematic-isotropic liquid transition point can be freely selected, it is possible to take advantage of the rapid change in the transparency at this point to provide a very sensitive temperature detecting devices. The sensitivity of the device to temperature will be about 0.05°C.

As described above, the present liquid crystal is a mixture of compounds (I) p-methoxybenzal-p-amino-α-methyl-cinnamic acid n-propylester, (II) p-methoxybenzal-p'-actoxyaniline and (III) p,p'-di-n-hexyloxyazoxybenzene and, when a pair of electrodes at least one of which is transparent is applied across such liquid crystal to form a liquid crystal device, the device can be operated as a display device at room temperature. If both of the electrodes are transparent, the device can be used as a light attenuating filter.

Furthermore, when anisole is added as a fourth component to the three-component liquid crystal, the device can be operated in lower temperature range.

Thus, with the present novel liquid crystal material, a liquid crystal device is obtained which can operate at room temperature, which the conventional device can not do.

Figure 2:
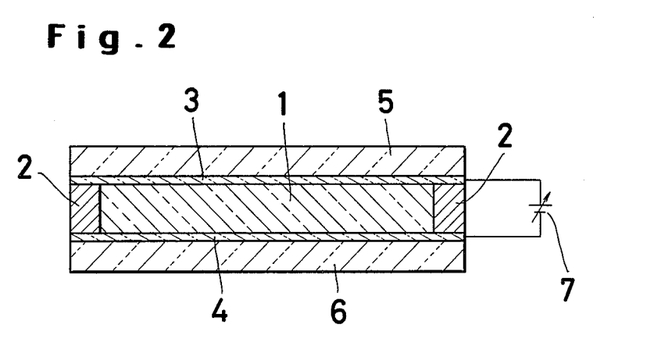
FIG. 2 is a cross section of a variable transparency - reflectance device using the liquid crystal having the characteristics shown in FIG. 1.
Figure 3:
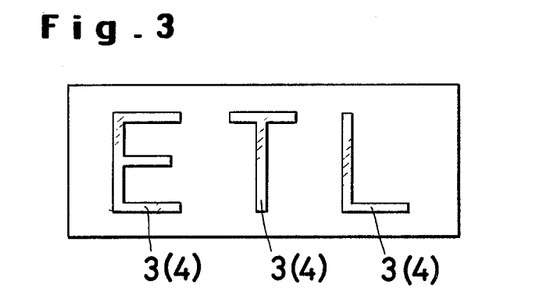
FIG. 3 shows an example of electrode structure of the liquid crystal device shown in FIG. 2.

FIG. 2 is a cross-sectional view of an embodiment of variable transparency-reflectancy device using the above described liquid crystal material. In FIG. 2, liquid crystal having the characteristics shown in FIG. 1 is encapsulated between a pair of spacers 2 and a pair of oppositely disposed transparent electrodes 3 and 4. The electrodes 3 and 4 are supported by glass or plastic plates 5 and 6 disposed externally. A voltage is applied across the transparent electrodes 3 and 4 from a variable voltage source 7. With this voltage application only the portion of the liquid crystal which is covered by the electrodes provides a milk-white appearance due to the electro-optical effect referred to as dynamic scattering mode, and, when the shape of one of the electrodes 3 or 4 is such as shown in FIG. 3, the shape can be clearly displayed.

Next there will be described a liquid crystal device which can generate an electromotive force when irradiated with light and in which the polarity of the electromotive force can be reversed by changing the direction of irradiation. A device having such properties is called a photo-electric converter device.

Figure 4:
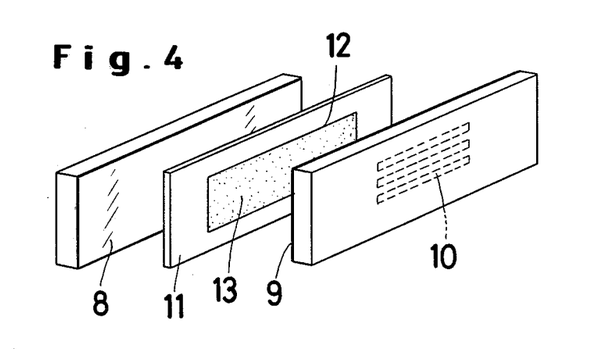
FIG. 4 is a perspective view of a liquid crystal device capable of converting a light to an electric energy, in disassembled state.
Figure 5A:
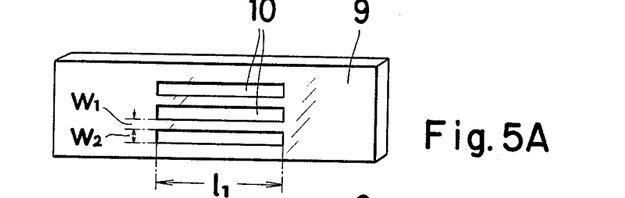
FIGS. 5A and 5B show examples of one of electrodes of the liquid crystal device shown in FIG. 4.

FIG. 4 shows, in disassembled perspective view, an embodiment of such a device. In FIG. 4, a pair of oppositely disposed transparent electrodes 8 and 9 are formed in the usual manner by vapor-depositing tin oxide ($SnO_2$) or gold on transparent insulating plates of glass, plastic etc. One of the electrodes, electrode 9 for example, includes portions of different material such as slits 10 as shown in FIG. 5(A), to make it a striped transparent electrode and dissimilar to the other electrode 8. A spacer 11 has a central opening 12 and the above mentioned components are assembled so that a liquid crystal 13 is completely sealed in the region defined by the opening 7 and the transparent electrodes 8 and 9 and a light can be directed to either of the electrodes to thereby form a photo-electric converter device.

As the liquid crystal 13, the aforementioned mixture of compounds (I), (II) and (III) or (I), (II), (III) and (IV) may be employed.

Figure 6:
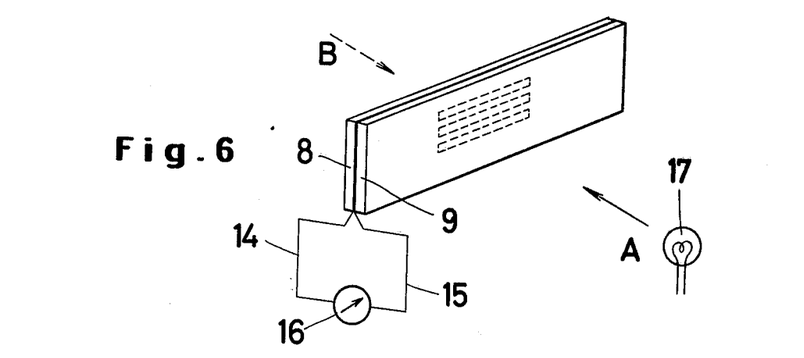
FIG. 6 illustrates an operation of the liquid crystal device in FIG. 4.

FIG. 6 is useful to explain the operation of the device shown in FIG. 4 in which the transparent electrodes 8 and 9 are connected through a pair of lead wires 14 and 15 to a detector 16 such as voltmeter or ammeter etc. When the device is irradiated by a light source 17 in the direction "A", the detecter 16 is energized. When the irradiation is in the "B" direction, the movement of the needle of the detector is reversed in direction. The detected electromotive force is substantially proportional to the intensity of illumination.

An example of the measurement obtainable with this device is now given. Where the transparent electrodes 8 and 9 were both 7.6 × 2.6cm$^2$ in area, the length $l$ and width $w$, of the slits 10 provided in the electrode 9 were 20mm and 3mm, the distance between the adjacent slits $w_2$ was 1 mm and the aforementioned mixture of materials (I), (II) and (III) in the ratio of 4 : 4 : 1 was used as the liquid crystal material in a thickness in the device of 25$\mu$,, an output voltage of about 0.5 volt obtained when the device was illuminated by a fluorescent lamp of 20 watts disposed 40cm from the device. In this case the electric power obtained was $10^{-15}$ watts. When the device was illuminated in the reverse direction the output voltage became −0.5 volts.

In another measurement an electromotive force of 90$\mu$ volts was observed across a load of 500 k$\Omega$ for a device having a liquid crystal 25$\mu$ in thickness illuminated by a He-Ne laser beam of 0.5 m watts.

Figure 5B:
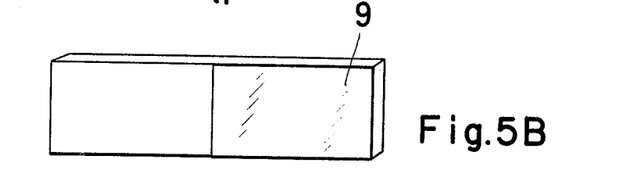

The pattern of the transparent electrode 2 is not limited to that shown in FIG. 5(A) but other patterns such as shown in FIG. 5(B) can also be employed provided that each of the transparent electrodes 8 and 9 has at least one opposing portion and the portions are asymmetrical.

From the results of experiments, it was found that the electromotive force of the device whose one transparent electrode has a pattern such as shown in FIG. 5(A) is larger than that having a pattern such as shown in FIG. 5(B) and that the electromotive force obtained by using the pattern in FIG. 5(A) becomes larger when the member of slits 10 is increased by making $w_1 \gg w_2$.

As described above, photo-electric conversion can be performed with employing the simple construction of sandwiching the liquid crystal between transparent asymmetrical electrodes. Furthermore, since the light energy needed can be of extremely low, there is no need to provide a special light source. Thus this device is widely applicable in light measurement, control by light etc.

The liquid crystal employed may be any nematic one other than the present novel mixture if the operating temperature is not limited to room temperature.

Figure 7:
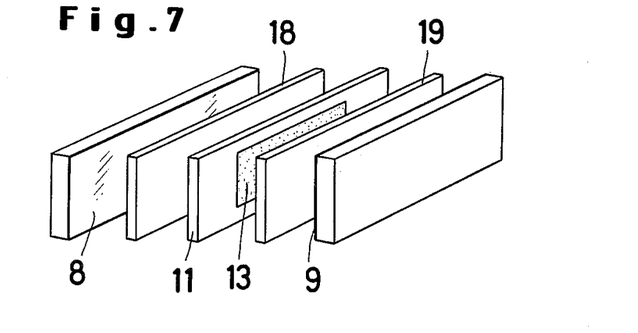
FIG. 7 shows another example of the liquid crystal device construction in disassembled perspective view.

It is further possible to use a construction wherein direct contact between the liquid crystal and the electrodes is blocked by inserting insulating film 18 and 19 of polymeric material as shown in FIG. 7. The blocking material can be inserted at either one or both of the electrodes.

Figure 8:
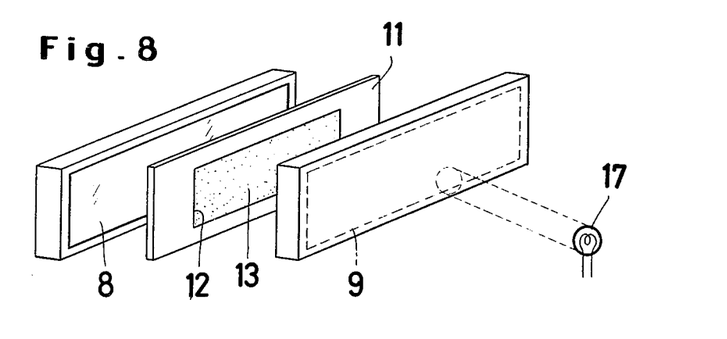
FIG. 8 shows another example of the liquid crystal device construction in disassembled perspective view.

Although, in the above described photo-electric converter device, asymmetrical transparent electrodes are used, the electrodes may be symmetrical rather than asymmetrical so long as the electromotive force to be generated need not be large. When the symmetrical arrangement is used, it is desirable to illuminate an edge portion of the transparent electrode 9 as shown in FIG. 8 and/or to use a laser etc. as the light source in order to increase the electromotive force to some extent.

Another embodiment of the present invention will now be described. This device is adaptable for use in a display device the display of which is electrically controlled and which provides an optically controlled electrical output.

Figure 9:
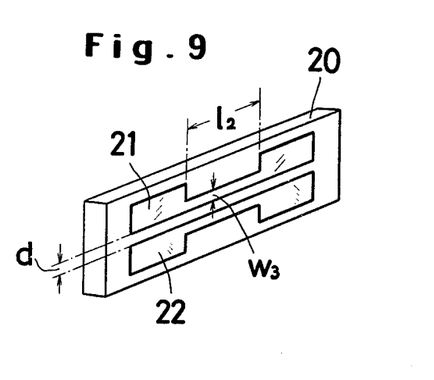
FIG. 9 illustrates a basic electrode construction of the liquid crystal device for use in a display-input device.
Figure 10:
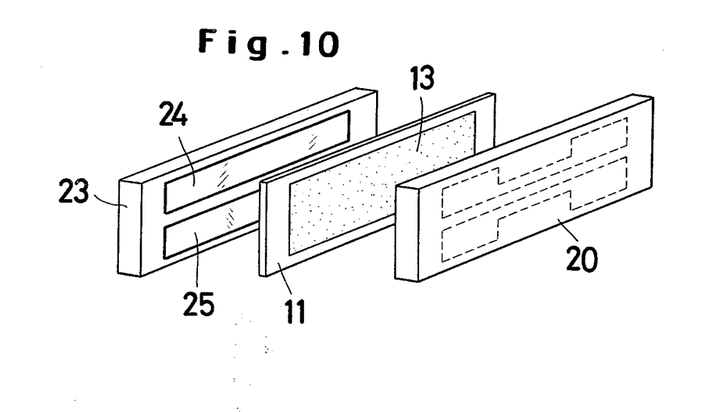
FIG. 10 shows a display-input device constructed with the electrode construction in FIG. 9 in disassembled perspective view.
Figure 11:
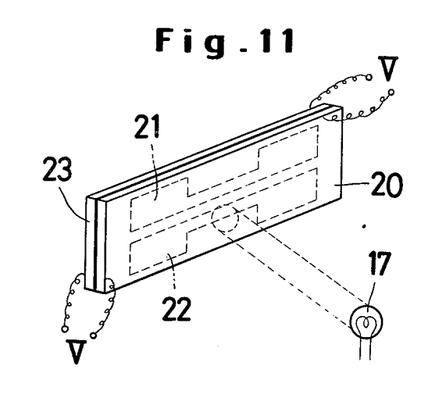
FIG. 11 explains the operation of the device in FIG. 10.

FIG. 9 shows diagrammatically the principle of operation of this embodiment in which a display electrode 21 and an input electrode 22 are formed by, for example, vapor-deposition on a common insulating substrate 20, the distance $d$ between the two-electrodes being extremely short. Opposing electrodes 24 and 25 are formed, for example, vapor-deposition on another insulating substrate 23 as shown in FIG. 10. When the substrates 20 and 23 having electrodes respectively are disposed on the opposite sides of a spacer 11 having a central opening 12 in which the liquid crystal 13 is contained and a voltage $V_1$ is applied across the display electrode 21 and the opposing electrode 24 as shown in FIG. 11, the portion of the liquid crystal existing between the two electrodes provides a milky white color. On the other hand, when a light is directed to the input electrode 22 an output voltage $V_2$ is obtained across the input electrode 22 and the opposing electrode 25. In this connection, the opposing electrodes 24 and 25 can be substituted by a single electrode.

Referring to FIG. 9, when the following dimensions were employed, no interference between the display electrode and the input electrode was observed and the electromotive force was the same as that obtained by the device in FIG. 6: $lo = 20mm$, $wo = 1$ mm, $d = 3mm$ and the thickness of liquid crystal $= 25\mu m$.

Figure 12:
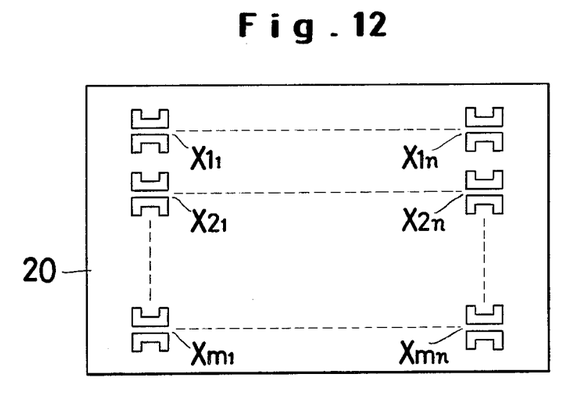
FIG. 12 is a plane view of an electrode disposition of the liquid crystal device of the present invention.

FIG. 12 is one electrode plate of another embodiment of the present invention which is provided with a plurality of the device shown in FIG. 9. (Devices of this type are hereinafter individually referred to as unit devices.) Each of the unit devices $X_{11} \ldots X_{in}, X_{21} \ldots X_{sn}, X_{ml} \ldots X_{mn}$ includes a display electrode 21 and an input electrode 22. In this embodiment, when it is assumed that $n = 7$ and $m = 5$, 35 unit devices are arranged on the plate 20 and by selecting appropriate display electrodes and applying a voltage to the selected electrodes the desired display can be had. Also by illuminating appropriate input electrodes with, for example, a pen light the desired information input can be accomplished. Such information may be processed by, for example, an electronic computer on the basis of the induced electromotive force and the position at which such electromotive force is generated.

Figure 13:
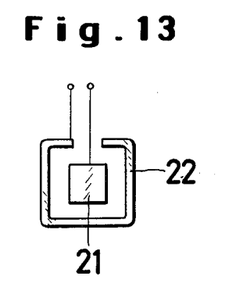
FIG. 13 is a plane view of another embodiment of the unit device of the present invention.

FIG. 13 shows another example of the unit device in which the input electrode 22 is disposed around the display electrode 21.

Figure 14A:
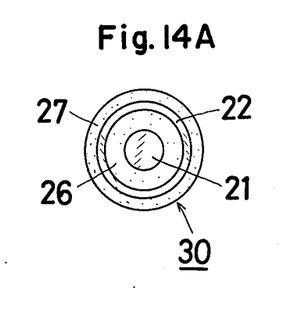
FIGS. 14A and 14B show plane and side views repsectively, of another embodiment of the unit device of the present invention.
Figure 14B:
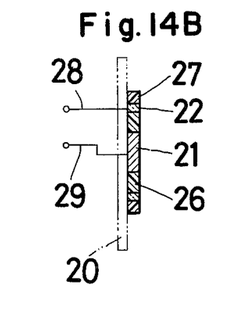

FIGS. 14(A) and (B) show a further example of the unit device in which the display electrode 21 and the input electrode 22 are disposed coaxially and electrically insulated from each other by disposing an insulator 26 therebetween 27 is an outer insulator and lead wires 28 and 29 are connected to electrodes 21 and 22 respectively. With this example, connection of the lead wires to the device is facilitated.

Figure 15:
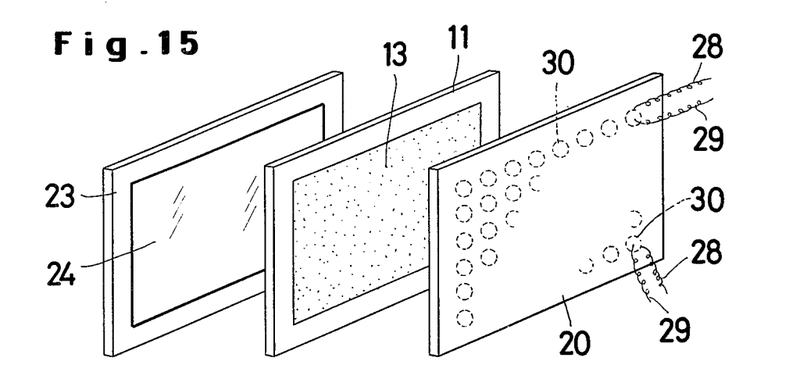
FIG. 15 is a disassembled perspective view of an embodiment constructed with the unit devices shown in FIG. 14.

FIG. 15 shows another embodiment in disassembled perspective view which is constructed with a plurality of the unit devices 30 shown in FIG. 14.

Figure 16:
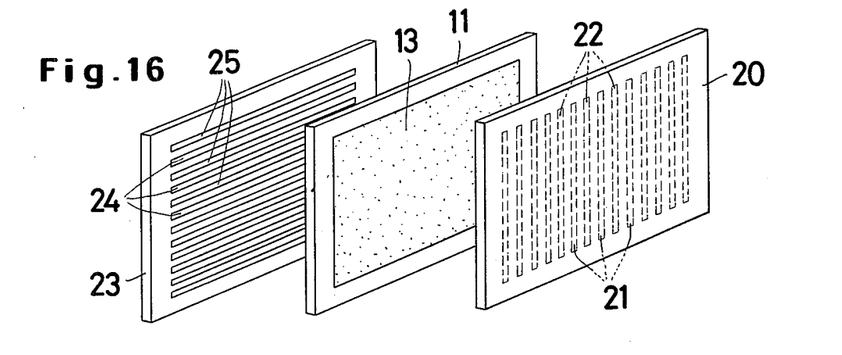
FIGS. 16 and 17 show further embodiments of the present invention, respectively.

FIG. 16 shows a further embodiment of the present invention in which a matrix is formed by the electrode plates sandwiching the liquid crystal 13 in such a manner that stripe-shaped display electrodes 21 and input electrodes 22 disposed alternately in one direction and similar shaped opposing electrodes 24 and 25 are disposed alternately in a direction normal to this direction so that the selected cross points of the electrodes become the display points or input points.

Figure 17:
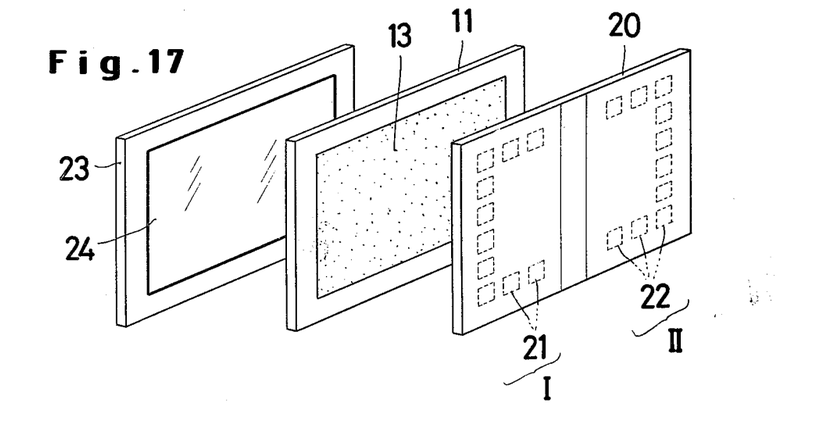

FIG. 17 shows another embodiment of the present invention in which a display section I is constituted with the display electrodes 21 and an input section II is constituted with the input electrodes 22. In this embodiment the display and input sections I and II may be provided on both sides of the device.

It is not necessary for the display electrode, input electrode, opposing electrode plate and insulating substrate all to be transparent but it is sufficient if only the electrode and substrate on the visual side is transparent. That is, if the device in FIG. 17 is to be viewed in the B direction, it is sufficient for the common opposing electrode 24 and the insulating substrate 23 to be transparent.

The input to this device is performed by directing light to the desired input electrodes using, for example, a light-pen or may be performed by illuminating the whole of the input electrode side surface and masking the undesired portion of the surface.

As described hereinbefore, according to this embodiment the display and the input of information not only can be performed easily but can be performed with devices of almost identical construction.

Accordingly, the device is widely applicable to, input-output devices for electronic computers, terminal units of fassimile devices etc.

If the operating temperature of the present element is not limited to relatively low temperature the liquid crystal material to be used in the device may be other than the present liquid crystal material.

The present invention further provides a liquid crystal device adapted to use in recognizing a contour of an image by spatially differentiating the contrast of the image.

It has been found that the photo-electric converting device using the present liquid crystal described above and shown in FIG. 4 has certain characteristics relative to the change of electromotive force with time. These characteristics are now discussed.

Figure 18:
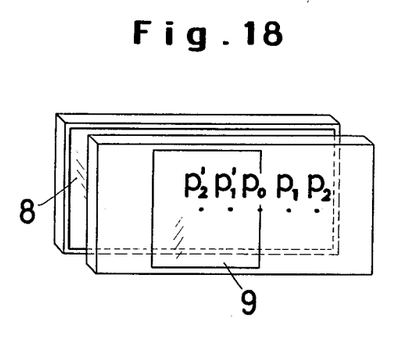
FIG. 18 illustrates the photo-electromotive force characteristic of the present liquid crystal device.
Figure 19:
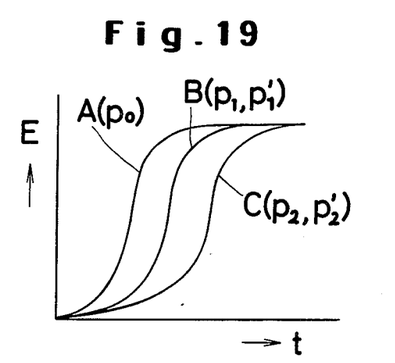
FIG. 19 shows electrical currents obtained by differentiating the outputs of the device in FIG. 18.

Referring to FIG. 18, it is first assumed that the electrode 9 is transparent and the opposing electrode 8 covers the whole of the transparent electrode area. Now, where point $po$ at the side edge of the transparent electrode 9 is taken as the origin and points $\rho_1$, $\rho'_1$; $\rho_2$, $\rho'_2$; .... are defined as points equally spaced to the right and left of the origin. When a light-spot is directed onto each of these points separately, the photo-electromotive force is as shown in FIG. 19. That is, when the abscissa represents time $t$ and the vertical axis represents the photo-electromotive force "E", a group of curves A, B, "C" ... are obtained which show that the point nearest to the edge of the transparent electrode 9 provides the fastest rise in the electromotive force. The curve A is obtained when the point $\rho_o$ is illuminated, the curve B when the points $\rho_1$ and $\rho'_1$ are illuminated and the curve C when the points $\rho_2$ and $\rho_2'$ are illuminated. From these curves it is apparent that the characteristics obtained at the points equally spaced from the edge $\rho_o$ are the same.

Figure 20:
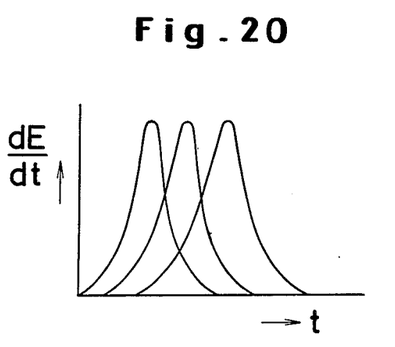
FIG. 20 shows electrical currents obtained by differentiating the output in FIG. 19.

When the curves A, B and C in FIG. 19 are time-differentiated the results are as shown in FIG. 20.

Figure 21:
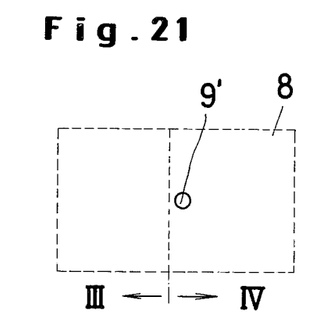
FIG. 21 illustrates the relation between transparent point electrodes and an incident light.
Figure 22:
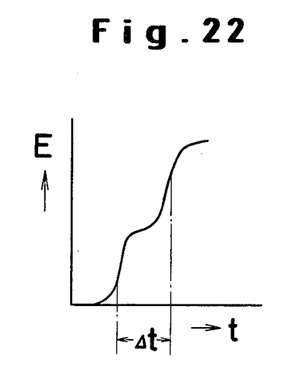
FIG. 22 shows the photo-electromotive force characteristics obtained from the relation shown in FIG. 21.
Figure 23:
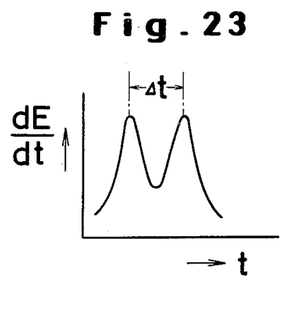
FIG. 23 shows electrical currents obtained by differentiating the output according to the characteristics shown in FIG. 22.

On the other hand, when a region III which is on the left side with respect to the transparent point electrode 9' is illuminated with a more intense light than that illuminating a region VI which is on the right side, the photo-electromotive force E and its time-differentiation are those shown in FIGS. 22 and 23, respectively. The time delay $\Delta t$ is about one second when the distance between the point electrode 9' and the illuminated portion is 1 mm.

An embodiment of the present invention utilizing this phenomenon will be described with reference to FIG. 24.

Figure 24:
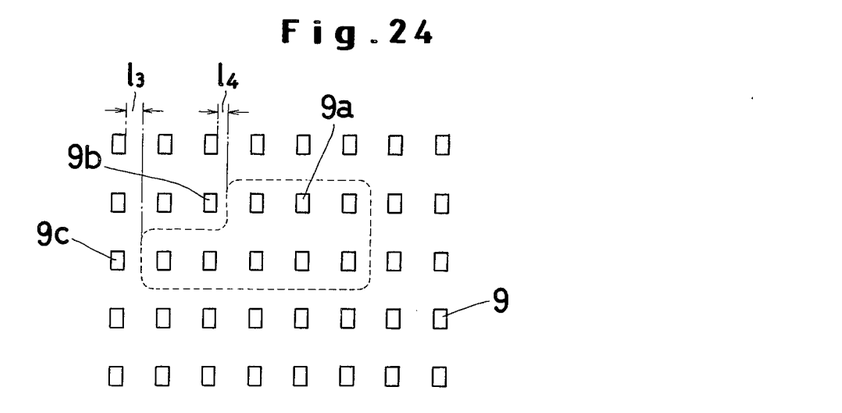
FIG. 24 shows an electrode distribution for explanation of the principle.

FIG. 24 shows a situation where a plurality of transparent electrodes 9 are disposed on a transparent substrate as a matrix and a light having a contour shown is directed onto the substrate, the opposing electrode plate being omitted. For the purpose of explanation, the electrodes which are in the contour of the light are represented by 9a, the electrodes which are at positions distant from the contour by $l_3$ are represented by 9b and those distant from the contour by $l_4$ are represented by 9c.

Figure 25:
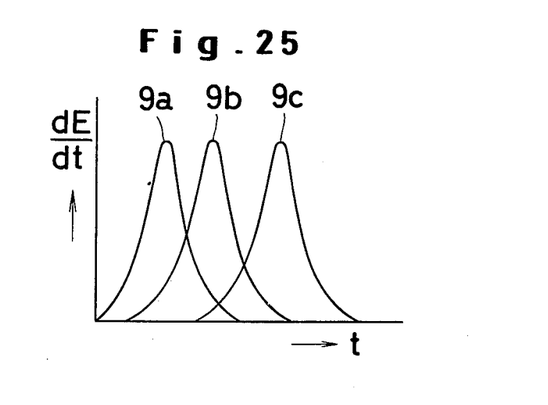
FIG. 25 shows electrical currents obtained by differentiating the output derived from the electrode arrangement in FIG. 24.

The illumination-induced photo-electromotive forces of the transparent electrodes 9a rise very rapidly and the rising time of the photo-electromotive force at the electrodes 9b and 9c outside of the light contour are slower by degrees dependent upon the distances from the contour. Accordingly the time-differentiations of the photo-electromotive forces become as shown in FIG. 25. While this explanation refers to only three groups of transparent electrodes, it should be noted that remaining electrodes can be considered in the same manner.

Thus, the spatial differentiation of the light illumination is converted to a time differentiation. Therefore the time at which $dE/dt$ becomes maximum represents the distance of the electrode from the illuminated portion and the height of the $dE/dt$ peak corresponds to the light intensity.

Although, in the explanation of FIG. 24 reference was made to a plurality of transparent electrodes, when the illumination is made in the reverse direction these electrodes may be opaque provided that the opposing electrode plate is transparent. Furthermore, it is not always necessary to arrange the plurality of electrodes in a regular manner as shown in FIG. 25 and it is sufficient that their position be fixed.

It will also be apparent that the light illumination pattern may be arbitrarily selected such as, for example, a doughnut shaped pattern, etc.

As described above, since this embodiment utilizes a photo-electric converting device using liquid crystal one electrode of which is divided into a plurality electrode portions and to which an image is projected and performs a spatial differentiation of the image by time-differentiating the electromotive forces produced at the respective electrodes due to the illumination thereof by the image, the spatial differentiation of the image can be very easily performed. Furthermore, since the liquid crystal itself is an insulator, there is no need to pay particular attention to the insulation between the respective electrodes.

With this embodiment, the recognition of the contour of the image is easy and since both the integrated image and the differentiated image are obtained at the same time, it is possible to emphasize the contour of the image. For this reason this embodiment can be used to focus the lens of a camera.

Thus with this embodiment a novel image processing can be realized, and with this technique the image differentiation can be easily obtained without the conventional complicated mathematical calculations by means of an electronic computer and thus this embodiment is applicable to a system for image recognition by the eyes of a robot, a system for focussing of a camera lens, etc.

Now, there will be described another embodiment of the present liquid crystal device which utilizes the present liquid crystal and the aforementioned time characteristics of the photo-electromotive force thereof. This device is suitable for use in detecting the relative positional relation of two objects from the output frequency of the electromotive force obtainable by rotating the device.

Figures 26A, 26B, 26C:
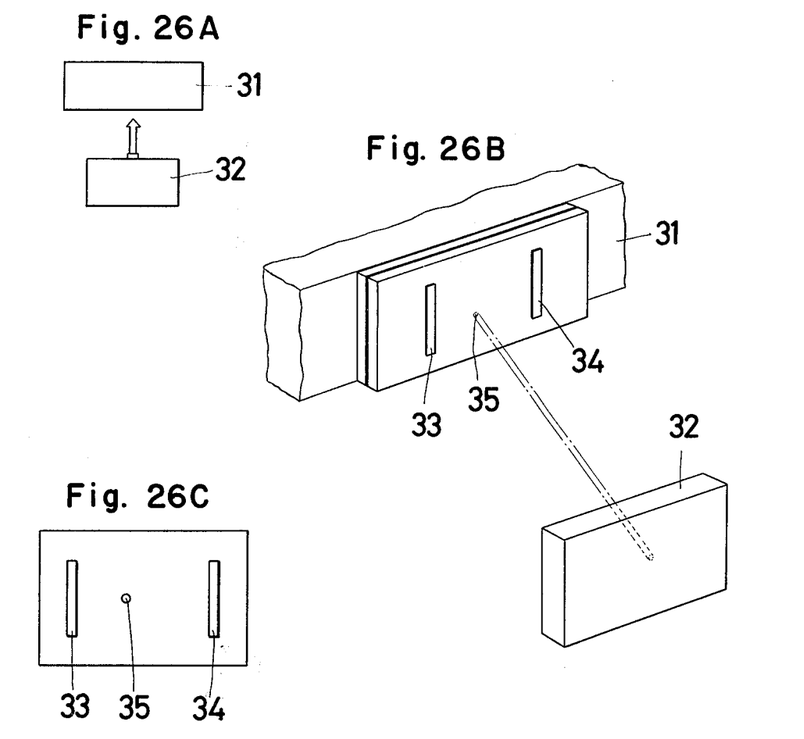
FIG. 26(A) shows relative positions of two bodies.
FIG. 26(B) shows the bodies in perspective view and FIG. 26(C) shows the relation between the electrode and a light spot.

This embodiment is based on the previously mentioned fact that in the photo-electric converting device using the liquid crystal, the rise of the photo-electromotive force generated is slowed proportional to the distance of the electrode from the illuminated portion. The principle of such detection will be described with reference to FIG. 26.

It is assumed that the positional relation of objects 31 and 32 in one direction is to be detected and measured as shown in FIG. 26(A). For this purpose, the present liquid crystal device having two electrodes 33 and 34 is mounted on the object 31 as shown in FIG. 26(B). In this connection the opposite electrode facing the electrodes 33 and 34 may be one having an area covering the combined area of both electrode 33 and 34 as in the previously described embodiment. The device mounted on the object 31 is illuminated by a light spot 35 from the object 32. FIG. 26(C) shows this relationship between the object 31 and 32 in plane view.

Figure 27A:
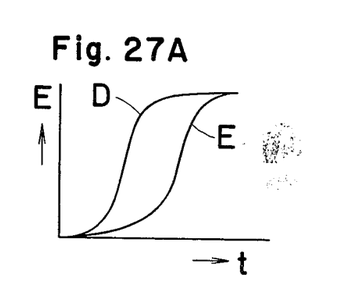
FIG. 27 shows the photo-electromotive force characteristics and the differentiated electrical currents similar to FIGS. 19 and 20.
Figure 27B:
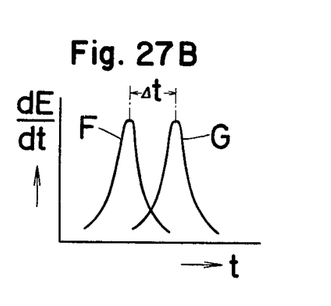

In FIG. 26(C), when the light spot 35 is at the center position between the electrodes 33 and 34, the rising characteristics of the photo-electromotive forces for both electrodes are the same. On the other hand, when the distance of the light spot 35 from the electrode 33 is shorter than that between the spot 35 and the electrode 34, the rising characteristics of the electromotive forces for the electrodes 33 and 34 are shown in FIG. 27(A) as curves "D" and E and, by differentiating the curves, curves "F" and "G" are obtained as shown in FIG. 27(B). The time interval $\Delta t$ between the times at which the peaks of curves F and G are obtained can be used to determine the position of the light spot 35.

Figure 28:
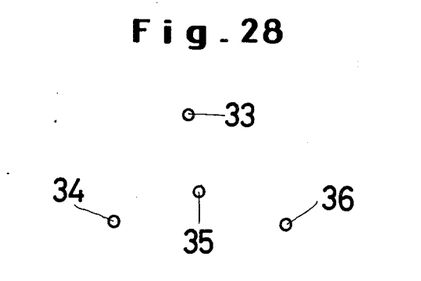
FIG. 28 shows an electrode arrangement when bidirectional position determination is to be performed.

The bidirectional relative position of the objects 31 and 32 can be determined by using the arrangement shown in FIG. 28. In this figure, 33, 34 and 36 are electrodes mounted on the objects 31 and 35 shows a light spot as in FIG. 26.

Since the method of differentiation of photo-electromotive force and the means for detecting the time delay are known by those skilled in the electronics, it will not be necessary to discuss these matters here. It is possible to determine the position of one of the objects using the other object as a reference, and, furthermore, it is also possible to determine the positions of the objects while they move relative to each other.

Figures 29A, 29B, 30A:
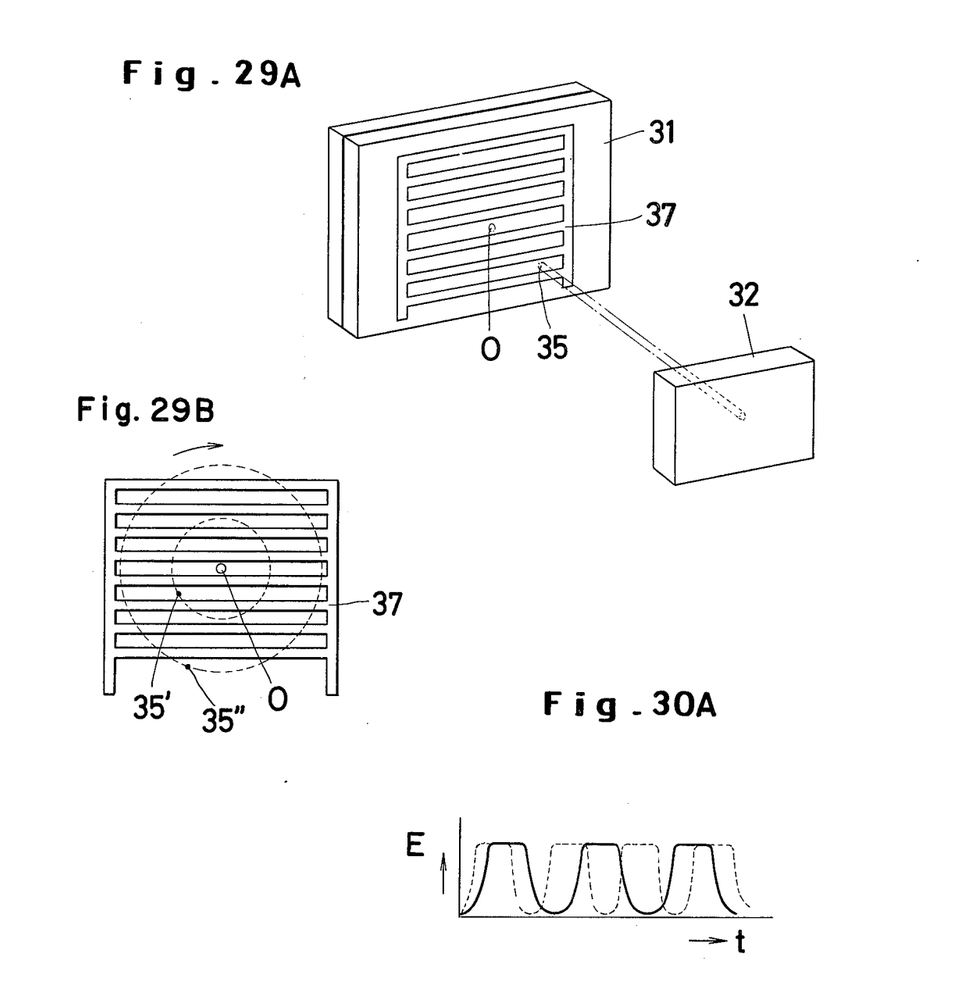
FIGS. 29A and 29B show in perspective view an embodiment when the present liquid crystal device is used to determine an object by detecting the frequency of output of the device.

FIG. 29 shows another application of the present invention in which a plurality of stripe-shaped electrodes 37 are provided on one electrode plate of the present liquid crystal device which is fixed on the object 31 as shown in FIG. 29(A) and positional determination is performed by utilizing the output frequency produced by rotating the device itself. The opposite electrode provided on the other electrode plate may be of an area which covers the combined area of the electrodes 37. The other object 32 projects a light beam which provides a light spot 35 on the one electrode plate of the device on the object 31. In this case the device is supported on the object 31 such that it can rotate about a center point O.

FIG. 29(B) shows the relation between the objects in plane view. Under these circumstances, when the light beam produces a light spot 35' on the device and the device is rotated at a certain speed, the spot 35' causes the device to produce an electromotive force such as shown by the solid line in FIG. 30(A). On the other hand, when the beam produces a light spot 35" more remote from the rotation center O on the device rotating at the same speed as in the above instance, the device produces a higher frequency output than that obtained by the light spot 35' as shown by the dotted line in FIG. 30(A). In other words, the output frequency of the rotating device becomes higher with the increase of the distance between the center O and the light spot 35.

Figure 30B:
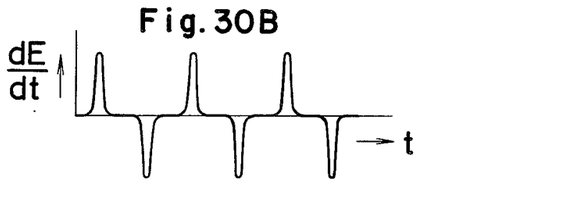
FIG. 30 shows the photo-electric characteristics and the differentiated electrical currents obtained from the arrangement in FIG. 29.

The output electrical currents in FIG. 30(A) are differentiated to obtain the electrical currents shown in FIG. 30(B) and, by counting the positive or negative portion of either of the electrical currents, the distance between the center O and the light spot can be determined precisely.

Figure 31:
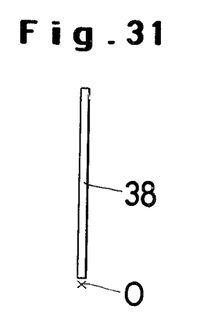
FIGS. 31 and 32 are examples of the electrodes of the device for determining a reference line.

In the above instance, the distance between the center O and the spot 35 are considered. However, if an angle between a reference line and another line on which the spot exists is known, the polar coordinates of the spot may be obtained. In order to achieve this, in FIG. 31, a liquid crystal device is provided which includes an electrode *l* and another transparent electrode opposing the electrode *l* and covering the whole of it, and this device is rotated coaxially with the stripe-like electrodes 37 shown in FIG. 29. The reference line may be provided by providing a light source on a object to which the electrode 38 is attached and constantly illuminating the electrode 38. Since the liquid crystal itself is highly transparent, the electrodes shown in FIGS. 29 and 31 can be used in overlapped condition.

Figure 32:
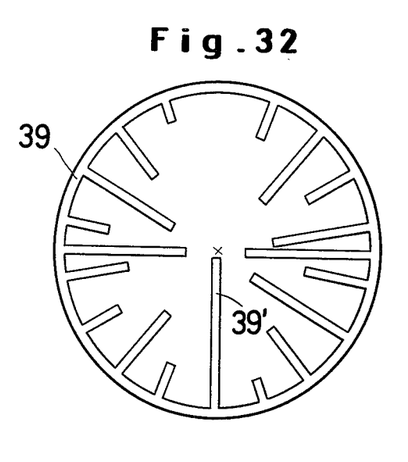

FIG. 32 shows another embodiment of the present invention in which the shape of one electrode 39 is made, as shown, with a common peripheral portion and a number of different length electrode pieces each extending from the peripheral portion toward the center O to obtain the higher output frequency with the longer distance between the center O and the spot. The electrode shown in FIG. 32 is symmetrical about the center except for the electrode piece 39' which is used to derive the reference line. Accordingly, if the reference line is not needed, the piece 39' may be elongated to reach the opposite point on the peripheral portion.

As described above, it is possible to very simply determine the relative position of two objects using the present liquid crystal device provided with two opposing electrodes, at least one of which is transparent so as to made the light incident side and one of which is constituted with a plurality of electrode pieces spaced apart from each other. That is, the relative position can be determined by mounting a device of this kind on one of the objects, projecting a light spot from the other object to the first object and obtaining the time delays of the electromotive forces obtained at the plurality of the electrode pieces.

Furthermore, the present device can be mounted on one of the object to rotate therewith at a constant speed. If the device is constructed to include a shaped electrode constructed in such a manner that the output frequency obtainable when a light spot is directed thereon is in reverse proportion to the distance between the spot and the rotation center, the distance between the center and the spot and hence the positions of the two objects can be determined only by detecting the output frequency from the element.

Since the present photo-electric converting liquid crystal device can be made in very small size, the mounting of it on any object is very easy. In addition to this, when both of the opposing electrodes of the device are transparent, it is possible to overlap a plurality of such devices to improve the precision thereof.

The present liquid crystal device can be further applied to a logic circuit. In this case the characteristic of the present device that the polarity of the photo-electromotive force generated upon illumination is reversed by reversing the direction of incidence is utilized to simulate a nerve network operable with a inhibitory synapis and an excitatory synapis.

Firstly the liquid crystal device suitable for use in this application will be described with reference to FIG. 33.

Figure 33A:
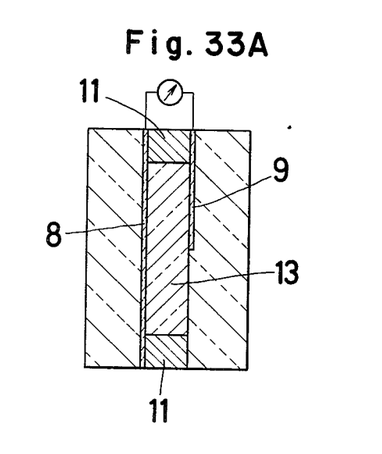
FIGS. 33A, 33B, 33C and 33D represent another embodiment of the present invention.

FIG. 33(A) shows a structure of the present liquid crystal device similar to that shown in FIG. 6, which is constructed with opposite transparent plates which are of such as glass and on which transparent electrodes 8 and 9 are provided respectively, spacers 11 and a liquid crystal 13 filling the space defined by the spacers and the plates.

When the device having this structure is illuminated by light, a photo-electromotive force is generated across the transparent electrodes 8 and 9 and the photo-electromotive force is large with asymmetrical electrodes, as mentioned previously.

Figure 33B:
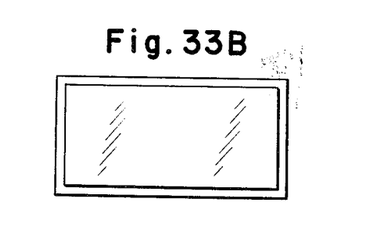
Figure 33C:
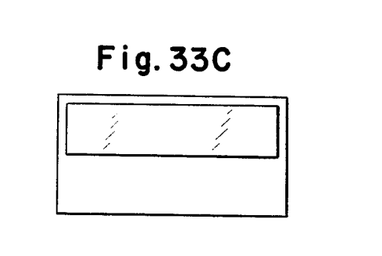
Figure 33D:
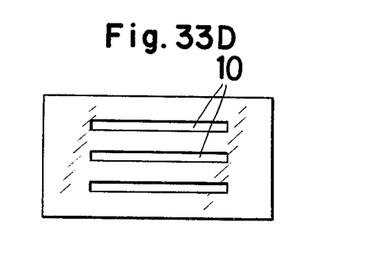

That is, the device has two opposite electrodes 8 and 9 and, when one of the electrodes is such as shown in FIG. 33(B) and covers the whole of one of the device sides, the other electrode should be small in area such as shown in FIG. 33(C) or should be one having slits 10 such as shown in FIG. 33(D).

Furthermore, as mentioned previously, the polarity of the electromotive force depends upon whether the illumination is in direction A or B as shown in FIG. 6.

Now, the nerveous system to which this device is applied will be briefly described.

Figures 34, 35, 36:
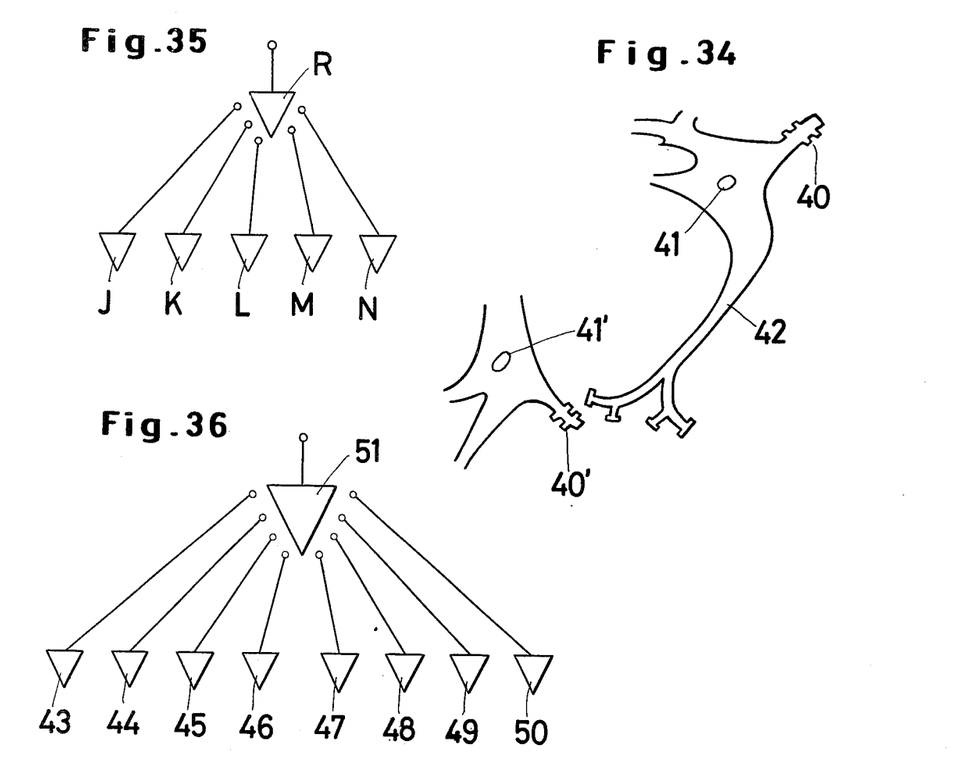
FIG. 34 illustrates a model of a nerve device to which the present device is simulated.
FIG. 35 is a block diagram of a nervous system constructed with the nerve device shown in FIG. 34.
FIG. 36 shows another embodiment of the present invention.

McCulloch and Pitts discovered that the neuron has a structure such as shown in FIG. 34. That is, a signal transmitted from an external nerve cell enters a dendrites 40 of the neuron and when the neuron 41 is excited by the signal a pulse signal is emitted from the neuron 41 through an axis cylinder 42 to a dendrites 40' of another neuron 41'.

The contact of the axis cylinder 42 with the dendrites 40' is made electrochemically and the mechanism thereof is referred to as synapis. Synapis includes excitatory synapis and inhibitory synapis.

For example, for the nerve network such as shown in FIG. 35, it is assumed that nerves "J", "K" and "L" contact with a neuron "R" in excitatory synapis and nerves "M" and "N" contact with the neuron R in inhibitory synapis. Under these conditions, when the difference between signals from the nerves J, K and L and signals from the nerves M and N is equal to or larger than a threshold value of the neuron R, the neuron R is activated.

That is, when it is assumed that the threshold value of the neuron R is "3", the neuron R is activated only when all of the nerves J, K, and L are in operation and all of the nerves M and N are not in operation. As another example, if the threshold value of the neuron R is "2", the neuron R is activated only when any two of the nerves J, K and L are in operation and all of the nerves M and N are not in operation or when all of the nerves J, K and L are in operation and at least one of the nerves M and N is not in operation.

Thus, the nerve network in vivo is constructed with the excitatory synapis, the inhibitory synapis and the threshold logic.

The characteristic of the present liquid crystal device that the polarity of the photo-electromotive force is reversed upon reversing of the direction of incidence can easily be applied to provide a logic circuit simulating the excitatory synapis and the inhibitory synapis.

FIG. 36 shows an embodiment of this application in which elements 43, 44, 45, 46, 47, 48, 49 and 50 are photo-emissive elements and a device 51 is the present liquid crystal photo-electric converting device which provides a signal upon light illuminations.

When the photo-emissive elements 43, 44, 45 and 46 emit light beams to the left side of the device 51 and the elements 47, 48, 49 and 50 emit light beams to the right side of the device 51, the output signal from the photo-electric converting device 51 represents the difference between the light signals from the elements 47, 48, 49 and 50. In this case this arrangement constitutes a majority organ which is operable in accordance with majority logic.

Thus, the synapis such as shown in FIG. 35 can be easily simulated by the arrangement. In order to provide the same characteristics as that of the nerve network to this arrangement, it is sufficient to add elements or circuits having threshold logic to the arrangement.

As described, this arrangement utilizes the incident direction dependency of the photo-electromotive force of the present liquid crystal device and the inputs thereto are provided by light beams. For this reason, when it is desired to operate this arrangement to simulate the nerve network, the number of the synapes, regardless of the type thereof, i.e., excitatory or inhibitory, can be easily increased and both types of synapes can be given merely upon the incident directions of the lights which are the input signals. And, the majority logic and the difference of the input signals input to the repsective sides of the present liquid crystal device can be derived from the polarity of the photo-electromotive force and the amplitude thereof.

Furthermore, since the liquid crystal itself is an insulator as obvious from the conventional application of it to display devices, etc., a plurality of signals can be processed simultaneously in a single continuum of liquid crystal.

Figure 37:
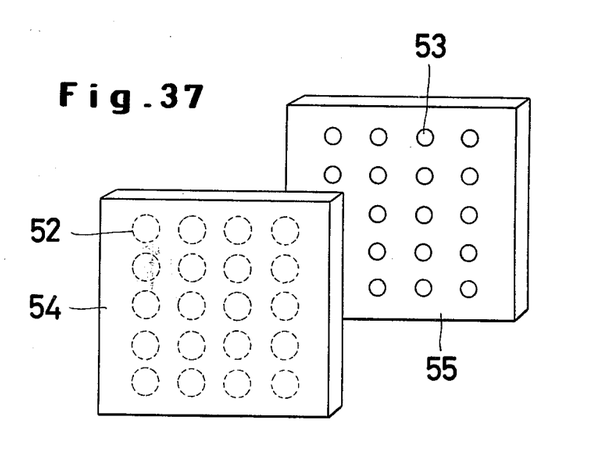
FIG. 37 shows a transparent electrode arrangement of the liquid crystal device used in FIG. 36.

That is, as shown in FIG. 37, by arranging a plurality of transparent electrodes 52 and 53 on the respective inner surfaces of the transparent plates 54 and 55 and filling the space therebetween with liquid crystal, a plurality of logic elements can be easily provided in which simultaneous signal processing becomes possible. In FIG. 37, one of the transparent electrodes can be a single electrode covering the whole area of the electrodes on the other side.

We claim:
1. A method for producing electrical energy by means of a liquid crystal device comprising, in combination, a pair of opposing electrodes disposed in paralleling planes, at least one of said electrodes being transparent, a sealed space between said electrodes containing a nematic liquid crystal, a pair of terminals each connected to each of said electrodes, and a utilization means connected between said terminals and disposed to receive a voltage from said liquid crystal, passing light rays through said transparent electrode of said liquid crystal device, and thereby producing voltage across said terminals to electrically activate said utilization means.

2. The method as set forth in claim 1, wherein said utilization means comprises a differentiation means connected between said terminals and a voltage detector connected to the output of said differentiator.

3. The method as set forth in claim 1, wherein said liquid crystal is a mixture of P-methoxybenzal-P-amino-α-methylcinnamic acid-n-propylester, P-methoxybenzal-P'-acetoxyaniline, P,P'-di-n-hexyloxy-azoxybenzene and anisole.

4. A method for producing electrical energy by means of a liquid crystal device comprising, in combination, a pair of electrode plates disposed in paralleling planes, the first of said plates being provided thereon with a first electrode, the second of said plates being provided thereon with a plurality of spaced transparent second electrodes, a first electric terminal connected to said electrode on said first plate, a plurality of second terminals each connected to said respective second electrodes, a sealed space containing a nematic liquid crystal between said first plate and second plate, at least one light source disposed to irradiate said second plate having means for passing the light ray to said liquid crystal, and utilization means connected between said first electrode and said second electrodes and disposed to receive a voltage from said nematic liquid crystal, passing light rays through said transparent electrode of said liquid crystal device, and thereby producing voltage across said terminals to electrically activate said utilization means.

5. The method as set forth in claim 4, wherein said utilization means comprises differentiation means each connected between said first electrode and the respective one of said second electrodes and voltage detector connected to the output of said differentiation means.

6. The method as set forth in claim 5, further comprising a fastening means for securing said first plate to a moving body, whereby the movement of said moving body is detected by said voltage detector.

7. The method as set forth in claim 4, wherein said liquid crystal in a mixture of P-methoxybenzal-P-amino-α-methylcinnamic acid-n-propylester, P-methoxy-benzal-P'-acetoxyaniline, P,P'-di-n-hexyloxy-azoxybenzene and anisole.

* * * * *